United States Patent [19]
Wagner et al.

[11] 3,949,397
[45] Apr. 6, 1976

[54] IDENTIFICATION - FRIEND OR FOE SYSTEM AND METHOD

[75] Inventors: Gerhard Wagner, Schaftlach; Otto Albersdoerfer, Munich, both of Germany

[73] Assignee: Siemens Aktiengesellschaft, Berlin & Munich, Germany

[22] Filed: Oct. 21, 1974

[21] Appl. No.: 516,822

Related U.S. Application Data

[63] Continuation of Ser. No. 338,267, March 5, 1973, abandoned, which is a continuation-in-part of Ser. No. 107,653, Jan. 19, 1971, abandoned.

[30] Foreign Application Priority Data
Feb. 6, 1970 Germany............................ 2005471

[52] U.S. Cl. .......... 343/6.5 R; 343/6.8 R; 343/18 E
[51] Int. Cl.²........................ G01S 7/36; G01S 9/56
[58] Field of Search........ 343/6.5 R, 6.5 LC, 6.8 R, 343/6.8 LC, 18 E, 114.5

[56] References Cited
UNITED STATES PATENTS

| | | |
|---|---|---|
| 3,218,642 | 11/1965 | Newhouse et al. ............... 343/114.5 |
| 3,646,556 | 2/1972 | Bishop .............................. 343/6.5 R |
| 3,680,090 | 7/1972 | Bishop............................ 343/6.5 LC |
| 3,720,945 | 3/1973 | Chow et al....................... 343/114.5 |
| 3,725,935 | 4/1973 | Alpers............................... 343/114.5 |
| 3,750,163 | 7/1973 | Hecker.............................. 343/6.5 R |

*Primary Examiner*—Malcolm F. Hubler
*Attorney, Agent, or Firm*—Hill, Gross, Simpson, Van Santen, Steadman, Chiara & Simpson

[57] ABSTRACT

Identification — friend or foe systems which utilize computer control continuously changing interrogation signals and responding signals have been developed. The signals are varied in a time dependent manner, however, it is possible that an intruder might intercept a proper responding signal and repeat the code of this responding signal, and thus confuse the interrogating station. The present system allows a responding signal to be used only once during a particular time interval so that an interrogating station will know that if an otherwise proper responding signal is received twice during a time interval, that the second signal is spurious.

9 Claims, 8 Drawing Figures

CODE 23 (A-CODE1) READY FOR READOUT

CODE 23 IS READ OUT AND CANCELLED THUS BLOCKING CODE 23 (A-CODE1) NEXT CODE 24 (A-CODE 2) IS READY FOR READOUT

IDENTIFICATION - FRIEND OR FOE SYSTEM AND METHOD

This is a continuation of application Ser. No. 338,267 filed Mar. 5, 1973, now abandoned, which is a continuation-in-part of Ser. No. 107,653 filed Jan. 19, 1971, now abandoned. This invention can be used with the apparatus disclosed in co-pending application assigned to the assignee of the present invention entitled INTERROGATOR-RESPONDER SYSTEM filed in the United States Patent Office on Sept. 23, 1970 under Ser. No. 76,272, now abandoned. This application is identified by the attorney's Case No. 70,403 and is based on German application P 19 46 247.6 filed in West Germany on Sept. 12, 1969.

BACKGROUND OF THE INVENTION

1. Field of the Invention:

This invention relates in general to identification-friend or foe systems.

2. Prior Art

The problem of identifying friends or foes with radar systems has existed for some time and interrogating stations have developed and transmitted code signals which when detected by friendly aircraft, for example, will respond by sending a coded response signal to the interrogating station. The codes are known to the interrogating and responding stations and make it difficult for intruders to falsely identify themselves. However, in such systems it is possible for a foe to monitor the interrogating and responding signals and to transmit a signal identical to a response previously monitored. Since such signal is identical to a responding signal that was proper at the time transmitted, the interrogating station might be confused or misled by the duplicate signal. It is also possible to jam the entire interrogation-answer system by frequently transmitting signals which merely repeat proper signals and codes since the interrogating station will be continually receiving spurious coded signals identical to those previously received. It is also possible for an enemy to locate apparatus answering an interrogation signal by transmitting a duplicate of an interrogating code which will be answered by responding stations and thus the enemy may locate the positions of the responding stations.

It is possible to eliminate or reduce the possibility of interference by continuously changing the interrogation and responding codes as a function of time. Such systems and apparatus are described for example in application Ser. No. 76,272. Such systems include interrogating and responding apparatus controlled by time standards and in a manner which is known of both stations such that the codes vary as a function by time and the responding signal will be transmitted only if the interrogating signal has the proper time relationship. Also, the responding signal varies as a function of time known to both the interrogating and the responding stations and based on a time standard similar to that utilized in the interrogating station.

However, due to the inaccuracy of time standards and because of differing transit times, which occur due to varying distances between interrogating and answering stations, it is possible for an enemy to detect the responding signal and re-transmit it so as to provide an interfering signal into the system.

SUMMARY OF THE INVENTION

The present invention relates to identification-friend or foe system such as used in time varying interrogation codes and time varying responding codes based on time standards and in which the variations in the codes are known at both the interrogating and responding stations. The present invention solves the problem of reducing interference caused by an enemy such as when the enemy emits simulated answering signals, jams the interrogation systems and also eliminates the possibility of the enemy taking bearings from emitted signals. The invention accomplishes this by providing that a responding station will not answer with a code which has been used for a particular time prior to his response. Thus, each code transmitted as an answer will in the system be blocked for a certain time so it cannot be transmitted again and thus if this code has been used recently and if it is re-transmitted by an enemy it will at once be recognized as an enemy transmission due to the fact that the code occurs twice in a short interval.

This prevents enemy apparatus from detecting a coded reply and re-transmitting it without being identified as an enemy transmitter. Also, this makes it difficult to jam interrogation systems by repeating the same code because such repeated signals will be immediately recognized as originating from an enemy transmitter. The length of time that a particular code will be blocked depends on the number of interrogations made during a time interval and also the desired degree of freedom from enemy interference. For example, in a practical system, the same answering code might be allowed after a lapse of time of one hour.

The invention provides that a responding device has simultaneously available several answering codes that are usable and acceptable by the interrogating station as an answer which assures that an answer will be given to inquiry from friendly interrogation apparatus. This is particularly important in the case of IFF systems used with secondary radar. The transmitting stations include storage means in which the codes previously used are retained for a certain time and their transmission during that time is prevented. The information in this storage means is erased after a suitable time and such code is then available for reuse in the system. The memory device might operate in the manner of a shift register wherein the information is shifted in time as each new stored answering code is placed in the memory device until it reaches the end of the shift register where it is then erased and the code is available for reuse.

Other objects, features and advantages of the invention will be readily apparent from the following description of certain preferred embodiments thereof taken in conjunction with the accompanying drawings, although variations and modifications may be effected without departing from the spirit and scope of the novel concept of the disclosure, and in which:

DESCRIPTION OF THE PREFERRED EMBODIMENTS

Figure 1:
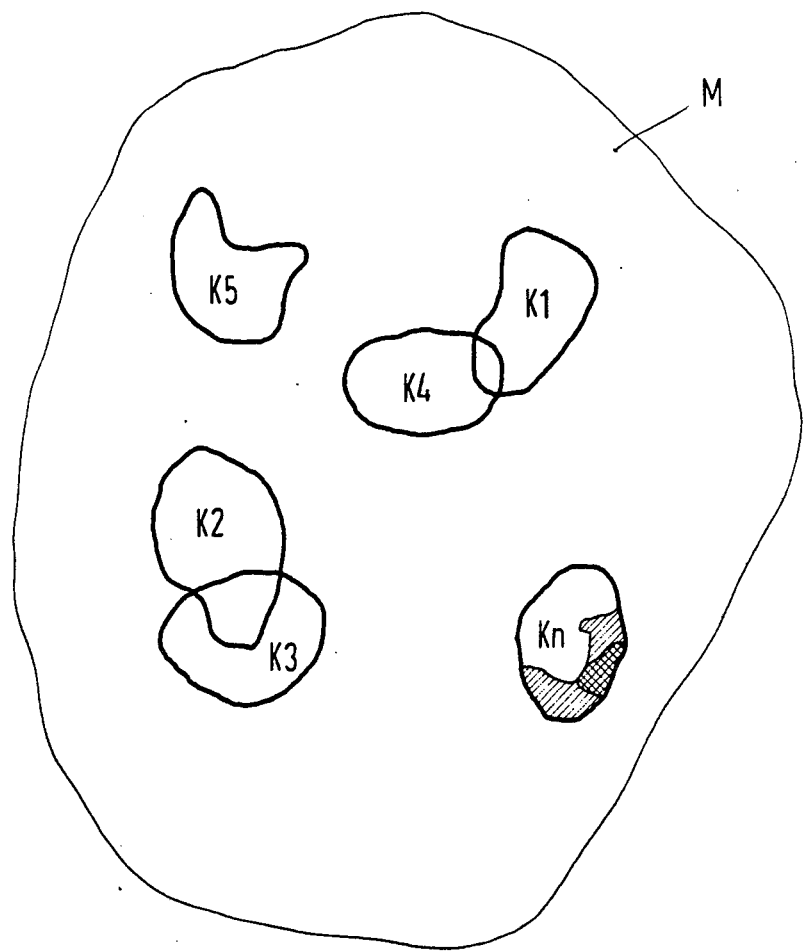
FIG. 1 illustrates the relationships among the total number of all possible interrogation codes and the interrogation codes valid at a particular time.
Figure 2:
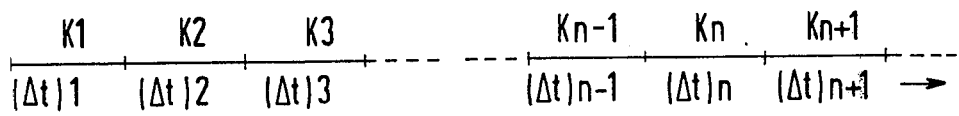
FIG. 2 is a time diagram illustrating the sequence of the partial amounts of interrogation codes valid at various times.

FIG. 1 illustrates the total of all possible answering codes which is designated by the symbol M. The areas $Kl$ through $Kn$ represent valid answering codes during a time $\Delta t$. FIG. 2 is a time diagram with $\Delta t$, time being broken up into increments $\Delta tl - \Delta tn+1$. Associated with each $\Delta tl - \Delta tn+1$ is a code element $Kl - Kn+1$ as illustrated. Certain code elements as, for example, code elements K2 and K3 may overlap in time. The code elements $Kl - Kn$ are chosen so that they have sufficient capacity such that even when a great many interrogations have occurred that at the end of the time interval $\Delta t$ there is a high probability that answering codes will be contained in the respective code element for answering an interrogation. Thus, for example, with reference to FIG. 1, the element $Kn$ includes a large number of usable answering codes for use in the time $\Delta tn$. For example, the portion of the code element $Kn$ which is shaded with slating lines indicates the maximum possible code values fixed by the particular system conditions that can be interrogated. The cross-shaded area in the code element $Kn$ illustrates the part of the usable code elements which have actually been used during the time $\Delta t$ and which have been blocked due to their use in interrogation. The shaded portion which is determined by cross-shaded lines can at the maximum, be as great as the slant-shaded portion. The answering codes selected for a code element K depends on the length of the time intervals $\Delta t$ during which they are valid, on the maximum answer sequence (repetition frequency) of the answering apparatus $fa$, and on the desired minimum answer probability of the answering apparatus $pa$. This may be expressed by the equation $$\Delta t \cdot fa = K(1-pa) \tag{1}$$

The total amount K of the disposable code should be very great as compared to the code elements $Kl - Kn$ so as to prevent an enemy from determining by randomly guessing codes that provide suitable answers. Since K can be very great, especially where interrogations rapidly follow one another, under some circumstances it will be necessary to use codes with high decision content $m$ where $m = 2 \log M$. The relationship between K and M and the relationship among the individual sub elements $Kl - Kn$ should be such that there is no discernible pattern that would allow the codes to be discerned or calculated by the enemy. This can be accomplished by utilizing suitable encoding processes. Which code element $Kn$ will be used during a particular time segment as, for example, in the time element $\Delta tn$ can be established by utilizing a key known by all of the interrogating and responding stations and in which the key is valid for only a limited time as, for example, one day. Synchronous master timers at the interrogating and responding stations assures that the particular code elements $Kl-Kn$ are valid during their associated time intervals $\Delta t$. The systems may also repeat the particular code elements over different time intervals as long as the time intervals are large enough that the use of the same code would be undetectable by the enemy.

During a transition from a time interval $tn$ to the time interval $\Delta tn+1$ special measures have to be provided to bridge over synchronization gaps either by overlapping or by the suppression of answers or interrogations during the transition time so as to avoid confusion.

Since during each time interval a different code element $Kn$ is used, the storing means which contains the already used answering codes can be erased at the end of each time segment 66 $tn$. Thus, the storage capacity required in the answering apparatus must correspond at most to the maximum possible number of answers occurring during the time $\Delta t$.

Possible distribution of answering codes are explained below with the use of a numerical example.

The accuracy of the synchronous timing system should be chosen such that time intervals of $\Delta t = 0.1$ sec. are possible. If it be assumed that the maximum answering sequency (repetition frequency) be $fa = 10$ kHz and the answer probability should in the most unfavorable case be at least equal to $pa = 90\%$ for each interrogation and responding occurrence, then the storage requirement in the responding equipment is 1000 codes ($\Delta t \cdot fa = 1000$).

Figure 3:
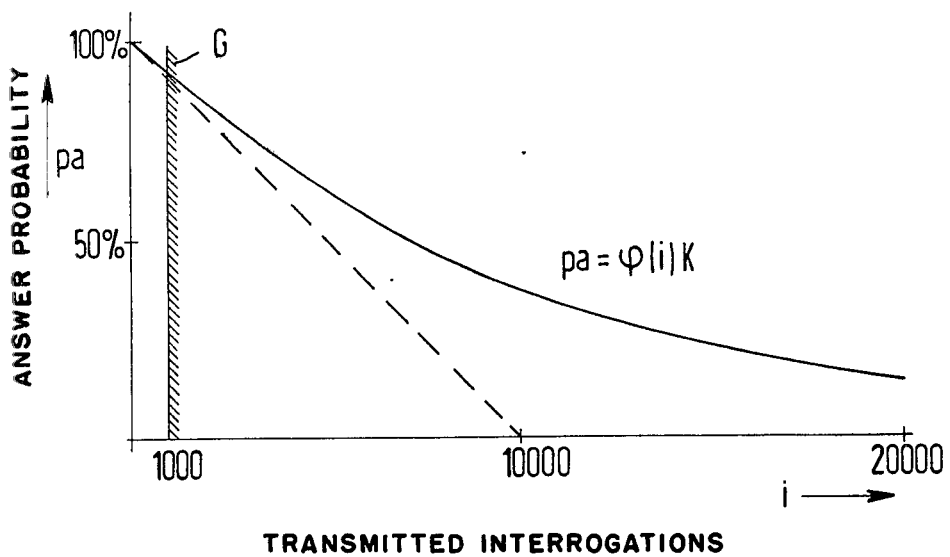
FIG. 3 is a graph illustrating the answering probability as a function of the number of interrogations.

FIG. 3 allows the determination of the code element K. Where on the abscissa is plotted the number $i$ of the transmitted inquiries during a time interval against minimum answer probability of the answering apparatus $pa$. For the answer probability $pa$, the equation $$pa = \phi(i)_K \tag{2}$$

holds.

This curve illustrated in FIG. 3 is valid if it be assumed that the number of interrogations occurring within the time $t = 10,000$ ($K = 10,000$). For high values of $pa$ the following equation approximately holds:

$$K \approx \frac{1}{(1-pa)} \cdot \Delta t \cdot fa \tag{3}$$

In the above assumed example the range of interest lies to the left of the line G in FIG. 3.

If the decision content of the interrogation code of $m = 36$ bits ($M \approx 6.87 \cdot 10^{10}$), then the ratio M/K in the above example where $K = 10,000$ become $M/K = 6.87 \cdot 10^6$. Thus, the probability that the enemy can guess the code becomes very small. If the maximum interrogation sequency (repetition frequency) is equal, for example, to the responding sequence frequency, $fa = 10$ kHz (that is, every 100 $\mu$sec an interrogation is possible), the enemy will receive, with steady statistical interrogating for locating purposes on the average only one answer every 11.4 minutes.

These numerical examples show that in the system of the present invention there are no unrealistic requirements and further illustrate that the system is practical. Thus, a secure system which is difficult to jam and also makes locating of the interrogating and responding station by the enemy difficult is provided by this invention. The essential conditions for obtaining the advantages of this invention are the synchronous time standards at both the interrogating and responding stations and the storage means in the answering apparatus or interrogating equipment and these may be easily accomplished in the present state of the art.

The time standard for the control of the sequence (repetition) of the interrogation code or the code elements of the interrogation codes can be dispensed with if in the responding apparatus there is a precisely calibrated time standard. For example, aircraft containing a collision avoidance systems operating on a time basis carry a precise standard and this may be utilized for the control of the interrogation codes or the code elements of the present invention. Also, modern techniques make it possible to provide precise time standards constructed, for example, by integrated circuit means which are relatively low in cost and are small.

Figure 4:
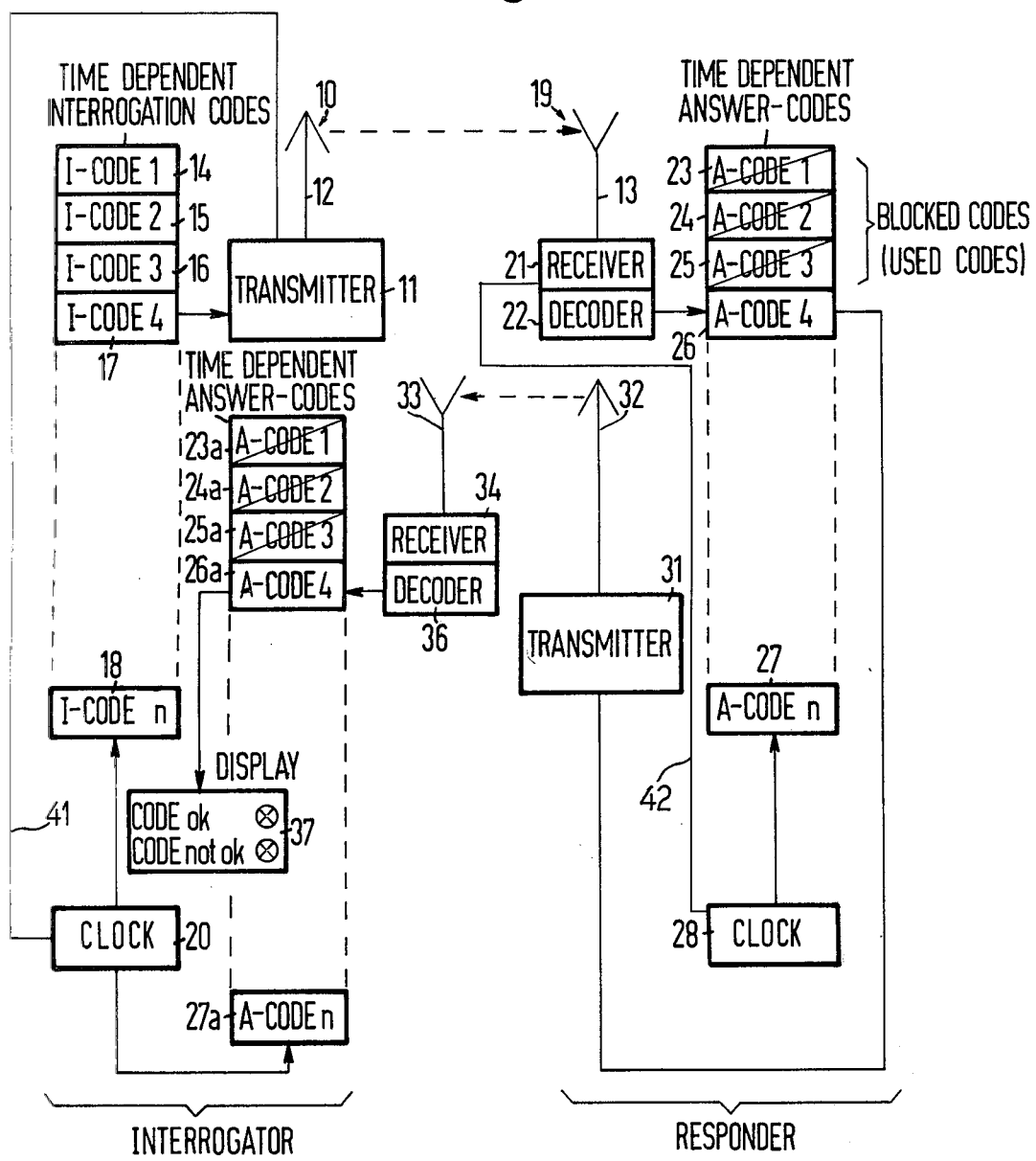
FIG. 4 is a block diagram of an interrogating station and responding station according to the invention.

FIG. 4 illustrates an interrogating station 10 and a responding station 19. The interrogating station includes a transmitting antenna 12 connected to a transmitter 11. The transmitter periodically transmits one of a plurality of time dependent interrogation codes 14–18 identified as I-Code 1 through I-Code n. A clock (time standard) 20 controls the selection of the particular code to be transmitted.

For the realization of this selection device those skilled in the art are familiar with a number of possibilities. For instance, the interrogation codes 14 to 18 can be stored in a shift register which is controlled by the clock 20 with a certain sequence. At the output of the shift register the interrogation codes 14, 15, etc. to 18 sequentially occur and can correspondingly be subsequently modulated in the transmitter 11 onto the carrier and be transmitted via the antenna 12. Each interrogation code 14 to 18 is thus only effective for the predetermined prescribed period, as controlled by the clock 20.

It is also possible to store the interrogation codes 14 to 18 in a storer or memory and to read them therefrom in a sequential manner. In this case the clock 20 controls the reading address to send the first code 14 then the code 15, etc. on to code 18 which are read out in sequence.

The responding station 19 is remotely located from the interrogating station 10 and might be mounted on a friendly aircraft, for example. The responding station 19 includes a receiving antenna 13 connected to a receiver 21 which feeds a decoder 22. The decoder 22 feeds time dependent Answer-Codes 23 through 27 which are successively blocked on a time dependent basis as used. For example, codes A-Code 1 through A-Code 3 are blocked in FIG. 4 and the responding station 19 responds with A-Code 4 at the particular time shown. A clock (time standard) 28 controls the selection of the particular answer codes to be utilized. A transmitter 31 receives the selected answer code and radiates it from an antenna 32.

Figure 5A:
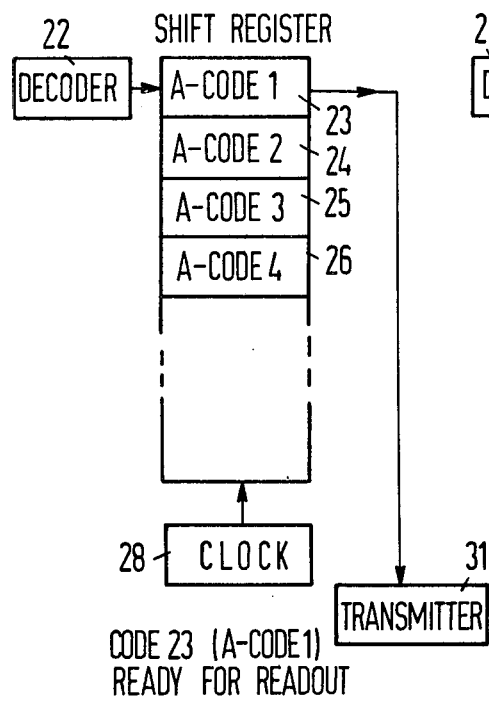
FIGS. 5a and 5b are block diagrams wherein the codes are contained in a shift register.
Figure 5B:
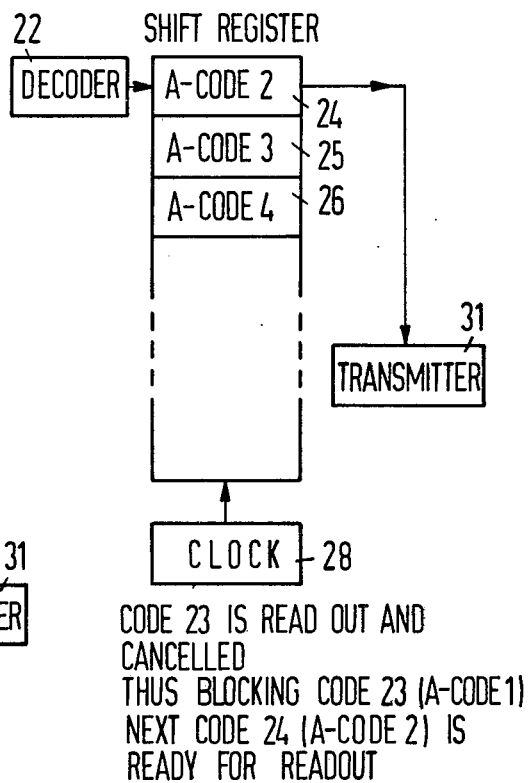

The blocking of the codes which have already been used may be accomplished in different ways. It is possible, for instance as shown in FIG. 5a, to accommodate the codes 23 to 27 in a shift register. The clock 28 shifts this shift register. For instance, the code 23 is read, then blocked, and the code 24 is made ready for the next readout as shown in FIG. 5b. Since in this case the code 23 is blocked, it is assured that it cannot be emitted again for a long time. (Blocking by cancelling).

Figure 6A:
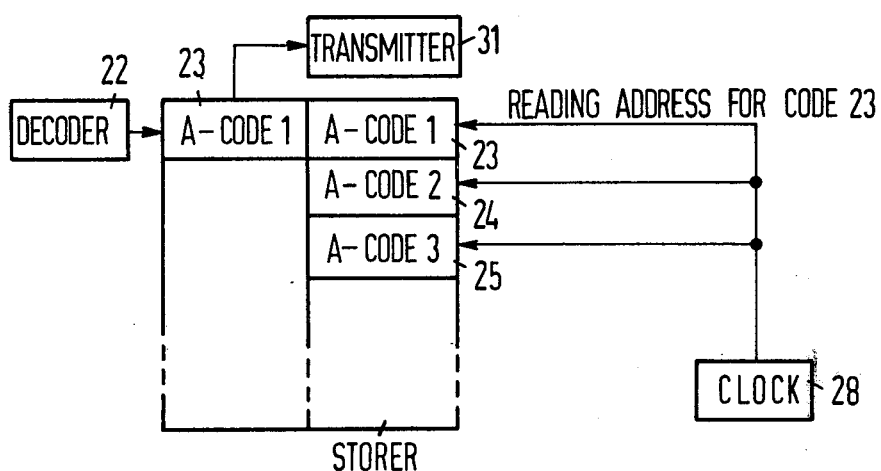
FIGS. 6a and 6b are block diagrams wherein the code is contained in a storer.
Figure 6B:
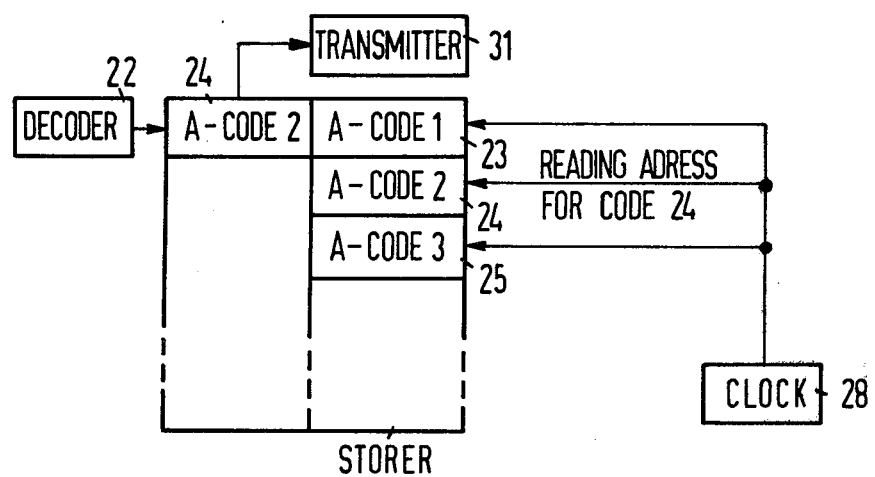

It is, however, also possible to read the answer codes without cancelling them. This may be done similar as described with the interrogation station. The codes 23 to 27 may be contained in a storer as shown in FIG. 6a and FIG. 6b, which has a reading address that is controlled by the clock 28. The first reading address is such that the code 23 is read (left side of the storer shown in FIG. 6a) and emitted as an answer signal. After a certain time the reading address is changed so that the code 24 is read (FIG. 6b) and so forth. By this progressive control of the read address from A-Code 1–A-Code$_N$, it is assured that reading of only one code at a time will occur and that codes which have already been used are blocked at least for a long period before being reused.

Reading without cancellation according to FIG. 6a and 6b has the advantage that the codes can be used anew after the full sequence has been used. This means in the present example that after the A-Code n has been used that the next code will be the A-code 1. It is to be noted, of course, that between the emitting of A-Code 1 and A-Code n that a long period will have lapsed and an enemy will not easily recognize the repetition. For example, codes might not be repeated in less than one hour.

A receiver 34 at the interrogating station is connected to an antenna 33 for receiving the signal from transmitter 31 and furnishes it to a decoder 36 which determines if the received code is a valid code.

In the receiver of the interrogation station which is also controlled by the clock 20, a device for the storage of A-Code 1 (23a) to A-Code n (27a) is provided which is constructed similar to the device in the responder 19. This device will therefore not be described in detail since its structure and operation is the same as the device 23–27 and clock 28 in the responder.

For the illustrated operational condition in FIG. 4 an interrogation with the I-Code 4 is answered by the A-Code 4 signal. If the decoder 36 is connected with the transmitter 10 A-Code 4, herein denoted with 26a and if an answer is received from a responder 19 which correctly answers with the A-Code 4, there will be coincidence between the decoded answer code from the decoder 36 and the A-Code 4 from 26a. The observer will be informed by an indicator 37 that the responder has responded with the correct answer code. The indicator 37 might indicate in this case — "code ok".

If, however, an answer is received which has been sent by an enemy it cannot be the A-Code 4 but will be a former used code. If for instance such an imitated answer arrives with the A-Code 2 (24a) the decoder 36 will supply the A-Code 2 whereas at this moment the A-Code 4 is supplied by device 26a, and the recording device 37 shows noncoincidence and indicates "code not ok". Thus, it is immediately known by the operating personnel that an enemy is attempting to confuse them.

If the interrogation station is switched to the I-Code 5 by the clock 20 and simultaneously at the responder 19 the A-Code 5 is enabled and the A-Code 5 will be emitted at interrogation station 10. The clocks 20 and 28 operate synchronously due to synchronizing signals on line 41 at station 10 and signal on line 42 at responder 19. The synchroneity signal is not necessary, if the clocks 20 and 28 run exactly enough. It is assured that this switching takes place simultaneously. Thus, it is assured that only answers of the correct answering code are decoded whereas an answer with the previously used A-Code 4 would be recognized as an enemy interference.

Thus, this invention provides increased security, anti-jamming and eliminates the possibility of an enemy locating a transmitting station by providing means for storing codes used during a responding period and for inhibiting their use after they have once been used for a particular time interval. Interrogating stations include means for storing used answering codes and for detecting when such used codes are used while they are in storage so as to detect transmission by the enemy and indicate this fact to the operator.

Although the invention has been described with respect to preferred embodiments it is not to be so limited in that changes and modifications may be made which are within the full intent and scope as defined by the appended claims.

What is claimed is:

1. An interrogation and responding system for time-dependently differing interrogation codes which are transmitted successively in time by an interrogation device and received by one or more answering units which know the time-dependent program of the interrogation device and which use a plurality of different time-dependent answering codes having a predetermined relationship to the interrogation codes, time standards in said interrogation device and in said answering units to provide a time standard for the control of the code sequence, means in said answering units for blocking answering codes which have been used during a predetermined time interval for a certain time so that they may not be transmitted and cannot be used more than once unless all available codes have been utilized and means in said answering units transmitting an answering code upon the next interrogation which has not been blocked since it has not been used for said certain time and said interrogation device including means for accepting as correct only a single answering code from an answering unit which has not been previously used within a predetermined time interval and not accepting as correct an answering code which has been previously used within a predetermined time period so as to assure that if the same answering codes are received said interrogating device only accepts the first one received as correct and does not accept the second answering code as correct.

2. An interrogation and responding system according to claim 1 wherein said answering units contain means for providing simultaneously several answering codes which are usable and admissible for an answer.

3. An interrogation and responding system according to claim 2, in which the maximum number of interrogation codes simultaneously available is chosen such that even when the maximum possible number of interrogations from said interrogation device occur that there are available answering codes which are not blocked.

4. An interrogation and responding system according to claim 2, in which the number of codes acceptable for an answer from an answering unit at a particular time is considerably smaller than the total number of possible answering codes for an entire code sequence.

5. An interrogation and responding system according to claim 1, in which said answering units contain storing means in which answering codes recently used are retained.

6. An interrogation and responding system according to claim 5, in which said storing means is emptied of codes which have been stored for the longest time as additional answering codes are received by said storing means.

7. An interrogation and responding system according to claim 1 in which the selection of the answering code is made according to an unreproducible statistical distribution.

8. An interrogation and responding system according to claim 1, in which simultaneously valid answering codes are all changed at the same time.

9. An interrogation and responding system according to claim 8, comprising providing bridging measures when said answering codes are changed.

* * * * *